United States Patent
Legg et al.

(10) Patent No.: US 9,622,139 B2
(45) Date of Patent: Apr. 11, 2017

(54) METHOD FOR IMPROVING HANDOVER PERFORMANCE IN A CELLULAR WIRELESS COMMUNICATION SYSTEM

(71) Applicant: HUAWEI TECHNOLOGIES CO., LTD., Shenzhen, Guangdong (CN)

(72) Inventors: Peter Legg, Kista (SE); Hui Gao, Shanghai (CN); Guohua Zhou, Shanghai (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 0 days.

(21) Appl. No.: 14/478,364

(22) Filed: Sep. 5, 2014

(65) Prior Publication Data
US 2014/0378145 A1    Dec. 25, 2014

Related U.S. Application Data

(63) Continuation of application No. PCT/EP2012/053750, filed on Mar. 5, 2012.

(51) Int. Cl.
| | | |
|---|---|---|
| H04W 36/00 | (2009.01) | |
| H04W 36/30 | (2009.01) | |
| H04W 24/10 | (2009.01) | |

(52) U.S. Cl.
CPC ........ *H04W 36/30* (2013.01); *H04W 24/10* (2013.01); *H04W 36/0083* (2013.01)

(58) Field of Classification Search
CPC . H04W 36/30; H04W 24/10; H04W 36/0083; H04W 36/00
(Continued)

(56) References Cited

U.S. PATENT DOCUMENTS

| | | | |
|---|---|---|---|
| 2009/0096692 A1 | 4/2009 | Motta Cruz et al. | |
| 2010/0056157 A1* | 3/2010 | Verona et al. | 455/438 |

(Continued)

FOREIGN PATENT DOCUMENTS

| | | |
|---|---|---|
| EP | 0 964 595 A2 | 12/1999 |
| WO | WO 97/31487 | 8/1997 |

(Continued)

OTHER PUBLICATIONS

Jansen, T. et al., *Handover parameter optimization in LTE self-organizing networks*, 72 Vehicular Technology Conference, Sep. 6-9, 2010, Ottawa, Canada (18 pp.).

(Continued)

*Primary Examiner* — Marcos Batista
(74) *Attorney, Agent, or Firm* — Staas & Halsey LLP (57) ABSTRACT

Embodiments of the present invention relate to a method for improving handover performance in a cellular wireless communication system, said cellular wireless communication system employing a handover procedure in which a handover preparation for a mobile station is initiated if a channel quality value between a source cell for said mobile station and said mobile station is less than a channel quality threshold value; said method comprising: tuning said channel quality threshold value based on one or more handover performance criteria used in said cellular wireless communication system. Furthermore, the invention also relates to a device for improving handover performance, a computer program, and a computer program product thereof.

16 Claims, 5 Drawing Sheets

(58) Field of Classification Search
USPC .................................. 455/436, 437; 370/338
See application file for complete search history.

(56) References Cited

U.S. PATENT DOCUMENTS

| | | | |
|---|---|---|---|
| 2010/0240371 A1* | 9/2010 | Cook ................ | H04W 36/0083 |
| | | | 455/436 |
| 2010/0273487 A1 | 10/2010 | Alonso-Rubio et al. | |
| 2011/0086663 A1* | 4/2011 | Gorokhov et al. ........... | 455/522 |
| 2012/0202556 A1 | 8/2012 | Mori | |

FOREIGN PATENT DOCUMENTS

| | | |
|---|---|---|
| WO | WO 2008/116027 A2 | 9/2008 |
| WO | WO 2009/123512 A1 | 10/2009 |
| WO | WO 2010/104446 A1 | 9/2010 |
| WO | WO 2011/070643 A1 | 6/2011 |
| WO | WO 2011/146095 A1 | 11/2011 |

OTHER PUBLICATIONS

PCT International Search Report issued on Jul. 24, 2012 in corresponding International Patent Application No. PCT/EP2012/053750.

Kitagawa et al., "A Handover Optimization Algorithm with Mobility Robustness for LTE Systems", Personal, Indoor and Mobile Radio Communications, IEEE $22^{nd}$ International Symposium on, Sep. 11-14, 2011, pp. 1647-1651.

International Search Report mailed Aug. 2, 2012, in corresponding International Patent Application No. PCT/EP2012/053750.

* cited by examiner

METHOD FOR IMPROVING HANDOVER PERFORMANCE IN A CELLULAR WIRELESS COMMUNICATION SYSTEM

CROSS-REFERENCE TO RELATED APPLICATIONS

This application is a continuation of International Application No. PCT/EP2012/053750, filed on Mar. 5, 2012, which is hereby incorporated by reference in its entireties.

TECHNICAL FIELD

Embodiments of the present invention relate to a method for improving handover performance in a cellular wireless communication system. Furthermore, embodiments of the invention also relate to a device for improving handover performance, a computer program, and a computer program product thereof.

BACKGROUND

Normally user equipment (UE) in active mode in a cellular wireless communication system is handed over from one cell to the next as it moves through the network, and data can be transmitted and received without significant interruptions due to these handovers.

The handover (HO) procedure can consist of many steps. In most cellular wireless communication systems the handover is:
1) network controlled, i.e. the UE is commanded by the network when to connect to another cell;
2) prepared, i.e. the target cell (the cell that UE is moving to) is prepared;
3) UE assisted, i.e. the UE provides measurement reports before handover, to the serving cell to assist the decision to do handover preparation of target cell(s), and when to leave the serving cell/connect to the target cell.

In the context of handover, the serving cell before handover is often referred to as the source cell. After successful handover the target cell becomes the new serving cell. In LTE, the handover is a so called "hard handover", i.e. the UE radio link is switched from one cell (source) to another (target). In universal mobile telecommunications system (UMTS) hard handovers are used exclusively for time division duplexing (TDD) mode and may be used for frequency division duplexing (FDD) mode too.

Figure 1:
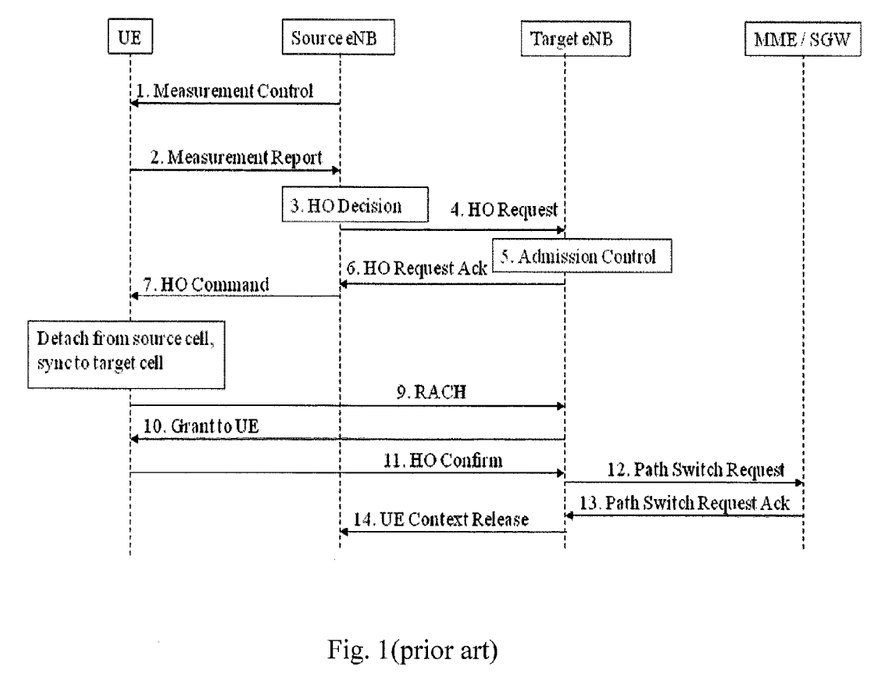
FIG. 1 illustrates LTE intra-frequency handover.

In the following discussion, see FIG. 1, the focus is on the intra frequency long term evolution (LTE) handover procedure, but the procedures are similar for the LTE inter radio access technology (RAT) and LTE inter frequency handover procedures. The intra evolved universal terrestrial radio access network (E-UTRAN) in RRC_CONNECTED state is UE assisted network controlled handover, with handover preparation signalling in E-UTRAN. The figure below depicts the basic handover scenario where core network nodes (the mobility management entity (MME) and serving gateway (S-GW)) do not change.

The handover is initially triggered by a measurement report sent from the UE to the serving eNB (evolved Node B). The serving eNB configures how the UE shall take measurements ("Measurement Control" step 1 in FIG. 1) and under what conditions a measurement report shall be triggered and sent to the eNB.

Figure 2:
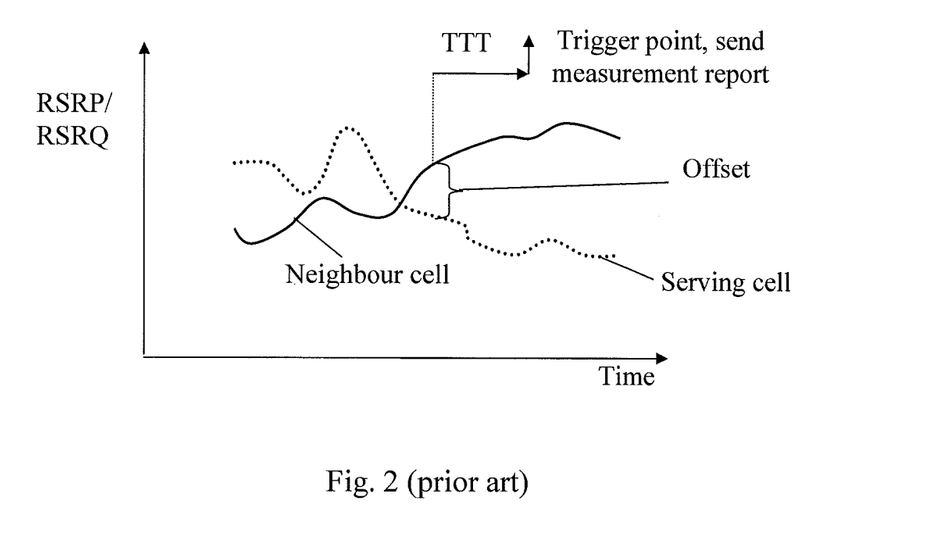
FIG. 2 illustrates a handover cell scenario.

To assist mobility control decisions, the UE can measure several different candidate targets cells and report the results to the network. Different networks and network deployments can have different detailed behaviour, but in most networks it is natural to trigger handover when signal reception from a target cell is better than from the source cell (FIG. 2). In the measurement report the UE includes the reason for the trigger (e.g. target cell stronger than serving cell) and measurements of the reference signal strength (RSRP) or quality (RSRQ) of the serving cell and several neighbours (including the target cell). To reduce ping-pong effects where a UE hands over repeatedly between two cells, a handover offset value is often added to the trigger condition: target cell should be better than the serving cell by the handover offset value (offset>0 dB).

When the serving eNB receives a measurement report and if it desires to handover the UE to another cell, it performs a handover preparation to that cell. Handover preparation involves a signalling exchange between one eNB and another eNB. The source cell requests the handover (Handover Request, step 4) and passes over UE context information; the target cell decides if it can admit the UE (Call Admission Control, step 5) and either accepts or rejects the handover. In the acceptance message (Handover Request Ack., Step 6) the target cell includes parameters required by the UE to allow it to communicate to the target cell these parameters are grouped into a transparent container.

Following a successful preparation, the handover execution takes place. The source cell issues the HO Command to the UE—this is the RRCConnectionReconfiguration message and carries the transparent container. If and when the UE receives this correctly it synchronises to the new target cell and sends a synchronisation message on the random access channel (RACH, step 9). The target cell then issues an allocation to the UE (step 10) so that it can send a HO Confirmation message to the target cell (the RRCConnectionReconfigurationComplete message, step 11).

The final steps, the Handover Completion, do not involve the UE. The source eNB is able to forward data (unacknowledged downlink packets) to the target eNB, and the S1-U interface from the S-GW must be switched from the source to the target ("path switch"). Finally, if the handover is successful the target eNB issues a UE Context Release message to the source eNB.

A successful handover requires (see FIG. 1):
  Measurement report delivery from the UE to the serving cell, followed by handover decision at the serving cell;
  Communication over the X2 between the serving and target eNB (HO preparation);
  Delivery of the HO Command RRC message from the serving cell to the UE;
  Successful random access and delivery of a HO Confirm RRC message to the target cell.

Failure of a handover can occur at any of these stages. The transmission of the RRC signalling to/from the UE is managed by the RLC AM protocol and this judges when failure has occurred (and attempts to transmit the message should be ceased). Additionally, the UE performs measurements of the quality of the downlink of the serving cell and can determine a radio link failure at the physical layer level when the quality is judged to be poor for a duration equal to a timer value, "T310". Since the "offset" is typically assumed to be greater than zero (otherwise ping-pong handovers between source and target are very likely), the majority of failures are expected to occur in the source cell before the HO Command has been delivered—the HO begins when the UE is already closer (in radio terms) to the target cell than to the source, and the UE moves further from the source as the handover proceeds. This generalization may be broken by randomness in the UE motion and by fragmented coverage caused by shadowing.

The UMTS hard handover is very similar in many respects—it is also UE assisted but in this case network controlled (the UE is configured to send triggered measurement reports but the network decides when to execute a handover), exploits preparation (using RL Setup procedure), is a "backward" handover (the source cell sends the HO command to the UE and the UE replies to the target cell) and is completed by inter-node signalling.

Handover algorithms are concerned with two performance aspects above all, namely:

Failures during the handover, or before the handover has been triggered; and

Number of handover events, however less important than the case above.

SUMMARY

An aspect of the present invention is to provide a solution which mitigates or solves the drawbacks and problems of prior art solutions.

Another aspect of the present invention is to provide a solution which improves handover performance.

According to a first aspect of the invention, the above mentioned aspects are achieved by a method for improving handover performance in a cellular wireless communication system, said cellular wireless communication system employing a handover procedure in which a handover preparation for a mobile station is initiated if a channel quality value between a source cell for said mobile station and said mobile station is less than a channel quality threshold value; said method comprising the step of:

tuning said channel quality threshold value based on one or more handover performance criteria used in said cellular wireless communication system.

Different embodiments of the above method are disclosed in the appended dependent claims.

The invention also relates to a computer program and a computer program product.

According to a second aspect of the invention, the above mentioned aspects are achieved by a device for improving handover performance in a cellular wireless communication system, said cellular wireless communication system employing a handover procedure in which a handover preparation for a mobile station is initiated if a channel quality value between a source cell for said mobile station and said mobile station is less than a channel quality threshold value; said device being arranged to:

tune said channel quality threshold value based on one or more handover performance criteria used in said cellular wireless communication system.

The present invention extends the usefulness of the network controlled handover method that determines to initiate the handover preparation when the channel quality value of the mobile station falls below a threshold. The inventors have recognised that it is difficult to set this threshold such that the handover performance (for example, handover failure rate) meets the required value. To address this problem the invention offers a mechanism to automatically tune the threshold value such that on one or more handover performance criteria such as handover failure rate and ping-pong rate meet requirements. Further, the number of handover events per second could also be included, although ping-pong rate is easier to measure. The mechanism comprises a simple control loop driven by measurements of handover failures, number of handovers and ping-pong rate.

The present invention is a method for handover optimisation in which a parameter (the quality threshold) that is not related to a triggered measurement report is tuned, based on one or more handover performance criteria, to perform the optimisation. This differentiates the method from previous methods that tune handover parameters such as A3 offset values and time to trigger values.

Furthermore, according to different embodiments it has been realized that other parameters of the network controlled handover can also be tuned. These parameters are those that govern the generation and transmission of measurement reports by the mobile station that are used to identify the best target cell: the offset value and the report periodicity. If the offset value is set too small there may be an excessive number of measurement reports (consuming network signaling and UE battery capacity), whilst if it is too large there will be some handovers that are initiated later than usual or initiated without knowledge of the best target cell (i.e. a blind handover). If the measurement report periodicity is too small there may be an excessive number of measurement reports (consuming network signaling and UE battery capacity), whilst if it is too large there will be an increased incidence of handovers directed to a cell which is not the best target cell.

Further applications and advantages of the invention will be apparent from the following detailed description.

BRIEF DESCRIPTION OF DRAWINGS

The appended drawings are intended to clarify and explain different embodiments of the present invention in which.

DESCRIPTION OF EMBODIMENTS

To achieve the aforementioned and other aspects, the present invention relates to a method for improving handover performance in a wireless communication system. It is assumed that the wireless communication system employs a handover procedure in which a handover preparation for a mobile station is initiated if a channel quality value between a source cell for the mobile station and the mobile station is less than a channel quality threshold value. The method comprises the step of: tuning the channel quality threshold value based on one or more handover performance criteria used in the cellular wireless communication system.

Handover performance criteria are often held to be Key Performance Indicators (KPIs) of a wireless network. The most commonly used handover KPIs are: handover failure rate (fraction of handovers that fail), call drop rate from handover (fraction of handovers that fail and lead to a call drop), handover frequency (number of handovers per second), handover ping-pong rate. The latter is a measure of the fraction of handovers for which the stay time in a cell is shorter than a threshold (e.g. 5 seconds).

The tuned channel quality threshold value is preferably used for initiating a handover preparation for the mobile station according to an embodiment of the invention.

According to an embodiment of the invention, the channel quality threshold value is increased if a handover failure rate $HO_{Error}$ is higher than a handover failure rate target $HO_{Error_{Target}}$ time a first constant $k_1$, i.e. if $HO_{Error} > k_1 \cdot HO_{Error_{Target}}$. Preferably, the first constant $k_1$ is equal to or larger than 1, and preferably has a value in the interval 1 to 1.3. The first constant $k_1$ when set to greater than 1 provides some hysteresis in the control loop. The channel quality threshold value is increased by an amount equal to a parameter $S_U$ according to another embodiment of the invention.

According to yet another embodiment of the invention, the channel quality threshold value is decreased if a handover failure rate $HO_{Error}$ is less than a handover failure rate target $HO_{Error_{Target}}$ times a second constant $k_2$, i.e. if $HO_{Error} < k_2 \cdot HO_{Error_{Target}}$. Preferably, the second constant $k_2$ is less than or equal to 1, and preferably less than or equal to 0.8. The second constant $k_2$ provides some hysteresis in the control loop when be set to less than 1. With the preferred values of both first and second constant, there is a margin around the handover failure rate target value over which the handover failure rate can fluctuate without inducing a change in the threshold value. This helps to give a smoother evolution of the handover failure rate with time. The channel quality threshold can be decreased by an amount equal to a parameter $S_D$.

Further, the channel quality threshold value can also be decreased if the condition $HO_{Error} < k_2 \cdot HO_{Error_{Target}}$ is fulfilled and if a handover ping pong rate $HO_{pp}$ is higher than a handover ping pong rate target $HO_{pp_{Target}}$, i.e. if $HO_{pp} > HO_{pp_{Target}}$. The channel quality threshold is decreased by an amount equal to a parameter $S_D$.

Figure 4:
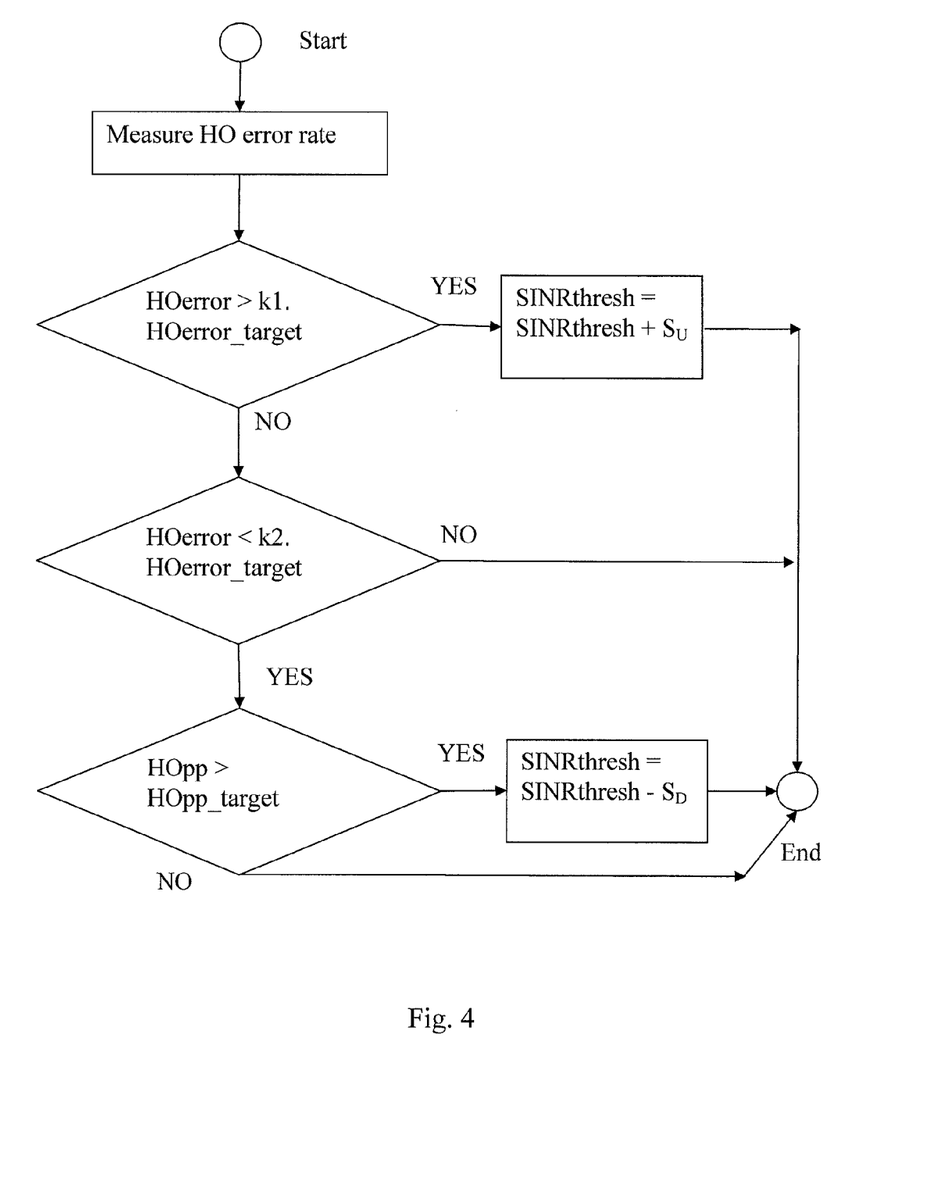
FIG. 4 illustrates an algorithm for tuning a handover parameter used in the present method.

All the above embodiments can be combined into different suitable algorithms for tuning the handover parameter. FIG. 4 illustrates a preferred embodiment of the invention. The flow chart describes the control function. When the failure rate is too high the quality threshold is increased and this results in earlier handovers and a reduction in failure rate. If the failure rate is too low then corrections are only made if the ping-pong rate is also too high—the correction delays the handover by reducing the quality threshold.

According to a preferred embodiment the channel quality value is a downlink signal to interference plus noise ratio (SINR) value $SINR_{DL}$ between a source cell and a mobile station. The downlink SINR value can be estimated by using one or more channel measurements in the group comprising: channel quality indication (CQI) reports, RSRP reported measurements, and RSRQ reported measurements. However, an uplink SINR value $SINR_{UL}$ between the source cell and the mobile station as the channel quality value can also be used.

Accordingly, the channel quality threshold value is a downlink SINR threshold value Sir between the source cell and the mobile station according to an embodiment. For good performance, the downlink SINR threshold value $SINR_{Tr}$ can be tuned so as to have a value in the interval 0 to −8 dB, and preferably in the interval −2 to −6 dB. Values in this range have been shown to demonstrate handover failure rate values in the range of 0.5 to 5% considering different radio environments (such as shadow fading), different UE speeds and different downlink load levels.

Furthermore, if the mobile station is arranged to periodically transmit measurement reports including measurements on reference signals transmitted from one or more candidate target cells, and the measurement reports are used for selecting a target cell, the present method may further comprise the step of: tuning a periodicity for the periodically transmit measurement reports based on the one or more handover performance criteria. If the measurement report periodicity is too small there may be an excessive number of measurement reports (consuming network signaling and UE battery capacity), whilst if it is too large there will be an increased incidence of handovers directed to a cell which is not the best target cell. Detection of the former is easy (measurement reports per handover can be measured), whilst in the latter case the failure rate can be measured as the periodicity is tuned.

The triggering of the periodically transmitted measurement reports can be performed in a number of different ways. However, assuming that they are triggered if a reference signal measurement of a candidate target cell is greater than a reference signal measurement of the source cell by at least a threshold handover offset value, the present method further comprises the step of: tuning the threshold handover offset value based on the one or more handover performance criteria, according to yet another embodiment of the invention.

If the offset value is set too small there may be an excessive number of measurement reports (consuming network signaling and UE battery capacity), whilst if the offset value is set too large there will be some handovers that are initiated later than usual or initiated without knowledge of the best target cell (i.e. a blind handover).

The above two mentioned parameters, i.e. the periodicity and the threshold handover offset value, can also be tuned by considering further aspects, such as the signaling load generated by the mobile station.

The following disclosure described a preferred handover method which can be used together with the present tuning method.

Furthermore, as understood by the person skilled in the art, any method according to the present invention may also be implemented in a computer program, having code means, which when run by processing means causes the processing means to execute the steps of the method. The computer program is included in a computer readable medium of a computer program product. The computer readable medium may include essentially any memory, such as a ROM (Read-Only Memory), a PROM (Programmable Read-Only Memory), an EPROM (Erasable PROM), a Flash memory, an EEPROM (Electrically Erasable PROM), or a hard disk drive.

Moreover, the present invention further relates to a device corresponding to the method for improving handover performance. Hence, device is arranged to tune a channel quality threshold value based on one or more handover performance criteria used in a cellular wireless communication system.

The device can be a standalone device but may be comprised or integrated in a network entity which is part of the Radio Access Network (RAN) like an eNB or split between the RAN and some optimization server like in operations support system (OSS). In the latter case, the decision to tune is made in the server, but execution is in the RAN by e.g. the eNB.

It should be understood that the present invention is not limited to the embodiments described above, but also relates to and incorporates all embodiments within the scope of the appended independent claims.

The following disclosure described a preferred handover method which can be used together with the present tuning method.

The handover method comprises the steps of: monitoring a downlink SINR value $SINR_{DL}$ between a source cell for a mobile station and the mobile station; selecting a target cell based on one or more measurement reports from the mobile station, wherein the measurement reports include measurements on reference signals transmitted from one or more candidate target cells; initiating a handover preparation to the selected target cell for the mobile station based on the downlink SINR value $SINR_{DL}$; and finally, handing over the mobile station from the source cell to the selected target cell. The candidate target cells are cells which the mobile station has detected.

The method therefore separates the signalling that carries measurements to identify the best target cell (i.e. the selected target cell) from the signalling (downlink SINR value $SINR_{DL}$) that determines the time to execute the handover for a mobile station. This is beneficial because the measurement reports alone do not provide a good basis to judge when the handover should be executed. For example, if a difference in RSRP values between a source and target cells is used then this represents an SINR that ignores interference from other cells. If RSRQ values are used (e.g. RSRQ in the source cell) then this is an inaccurate representation of the SINR.

The handover preparation may be initiated if the downlink SINR value $SINR_{DL}$ is less than a SINR threshold value $SINR_{Tr}$, i.e. if $SINR_{DL}<SINR_{Tr}$. The use of a threshold SINR value for initiating the handover preparation is advantageous because studies have shown that the delivery of the handover command is the key factor for handover success and this is dependent on the SINR threshold value $SINR_{Tr}$.

Regarding the downlink SINR value $SINR_{DL}$ these can be estimated in a number of different ways as realized by the skilled person. The downlink SINR value $SINR_{DL}$ is preferably estimated by using one or more channel measurements in the group comprising: CQI reports, RSRP reported measurements, and RSRQ reported measurements. CQI reports are readily obtainable from the UE using standardized procedures (periodic or aperiodic reporting), whilst RSRP/RSRQ measurements may be sent to the network node that controls the handover in measurement reports.

If RSRP reported measurements are used for estimating the downlink SINR value SINR and if the Physical Resource Block PRB usage is 100% in reported neighbour cells and there is no downlink power control (power spectral density equal for all PRBs) equation 1 below can be used. This method is only able to include (in the denominator) the interference from neighbour cells for which measurement reports have been received.

$$SINR_{serving} = \frac{RSRP\_serving}{noise + \sum RSRP\_neighboring} \quad (1)$$

If the RSRQ measured in the serving cell is known, the SINR may be determined by equation 2. This formula is accurate if all cells that cause downlink interference to the UE have a Physical Resource Block (PRB) usage of 100% and there is no downlink power control.

$$SINR_{serving} = \frac{RSRQ\_serving}{\frac{1}{12} - RSRQ\_serving} \quad (2)$$

When the PRB load is not 100%, the above formulae may need be modified to reflect the reduced interference from the candidate cells. This makes the calculations more complex because different cells employ different frequency allocations for the reference symbols (according to their PCI, physical cell ID, etc).

It should be noted that further channel quality parameters can also be considered together with the downlink SINR for initiating the handover preparation. Therefore, the handover method can also comprise the step of monitoring an uplink SINR value $SINR_{UL}$ between the source cell and the mobile station which means that the step of initiating the handover preparation further is based on an uplink SINR value $SINR_{UL}$. This is of particular importance for inter-frequency and inter-RAT handovers where the downlink signalling from the source cell can have very good SINR when the mobile moves to the edge of coverage of one RAT or frequency (so there is little interference from neighbour cells of the same RAT and frequency). Instead the uplink quality to the source cell can limit the handover performance, particularly because the coverage of an edge of coverage cell will be extended compared to cells surrounded by neighbours (of the same RAT and frequency), giving unusually high path loss for uplink transmissions by the mobile station.

As described above, the present method base the selection of the target cell among the candidate cells on measurements reports transmitted from the mobile station. The measurements reports include measurements on cell specific reference signals transmitted from the different candidate cells. The measurement reports preferably comprise RSRP and/or RSRQ measurements. These are standardized measurements in 3GPP specifications. As for the selection of the target cell, the cell which has the strongest signal strength among the candidate target cells in a last measurement report received from the mobile station is selected as the target cell.

In selecting the target cell on one or more further parameters can be used. The group of parameters comprises: load in the candidate target cells; cell size of the candidate target cells; transmission power of the candidate target cells; and handover history of the candidate target cells, such as handover failure rate. These additional parameters are useful when the criterion for selecting the target cell is more complex, considering more than just the strength of the target cell (RSRP). For example, the load may be useful if the source cell would like to ensure the handover preparation is successful—if the target is fully loaded the preparation may be rejected. The source cell can attempt to balance load between potential target cells. It may push UEs to cells that are loaded but not fully loaded to allow other cells to be switched off (e.g. to save network energy saving). The cell size is important in a heterogeneous deployment employing a mixture of large (macro) cells and small (micro/pico) cells. In this case the source cell can decide to avoid choosing a small target cell if the mobile station is known to be moving at a significant speed (e.g. in a vehicle). This would prevent a short stay time in the target cell. Handover history can be used to direct the mobile to a cell which has historically demonstrated a high handover success rate for incoming handovers from the source cell.

It has been realized that the measurements reports may be transmitted periodically or non-periodically from the mobile station. In both cases, the transmission of the measurements reports are triggered if a reference signal measurement of a candidate target cell is greater than a reference signal measurement of the source cell by at least a threshold handover offset value according to an embodiment of the invention. It has from tests been concluded that the handover offset value can be less than 2 dB, and preferably equal to or less than 1 dB which is lower than used in current systems. This relatively low offset value ensures that one or more measurement reports are delivered before the handover trigger time (as judged by the SINR), and thus the target cell identity is known. An even smaller offset will result in a greater number of measurement reports and thus unwanted signaling load within the network and battery consumption for the UE. Other ways of triggering the transmission of the measurements reports is by letting the transmission be triggered by A2, A3, A4, A5, B1, B2, 3A, 3C, 3D, 2B, 2C, 1C, 1E or 1G events if the wireless communication system is a 3GPP system such as LTE or UMTS.

The present handover method may further involve: receiving the measurement reports from the mobile station to be handed over so as to trigger the monitoring of the SINR by the reception of the first measurement report. Thereby the monitoring can be avoided until a possible target cell has been identified by the reception of the first measurement report. In another embodiment, the reception of the first or subsequent measurement report can be used to increase the frequency of CQI reporting by the mobile station. The period of periodic CQI reports can be reduced or more frequent aperiodic reports can be requested.

Figure 3:
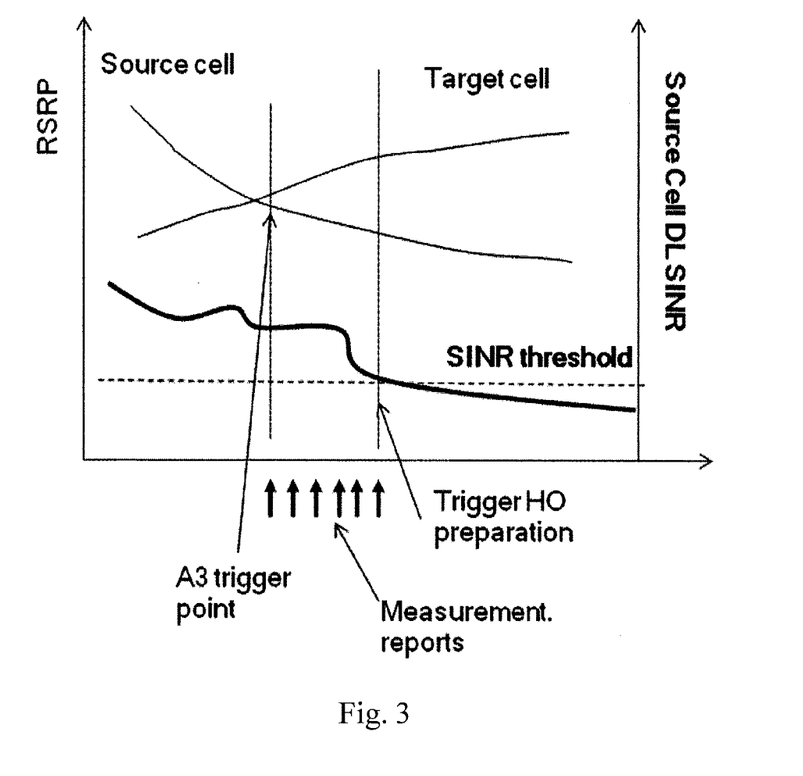
FIG. 3 illustrates an embodiment of the present invention.
Figure 5:
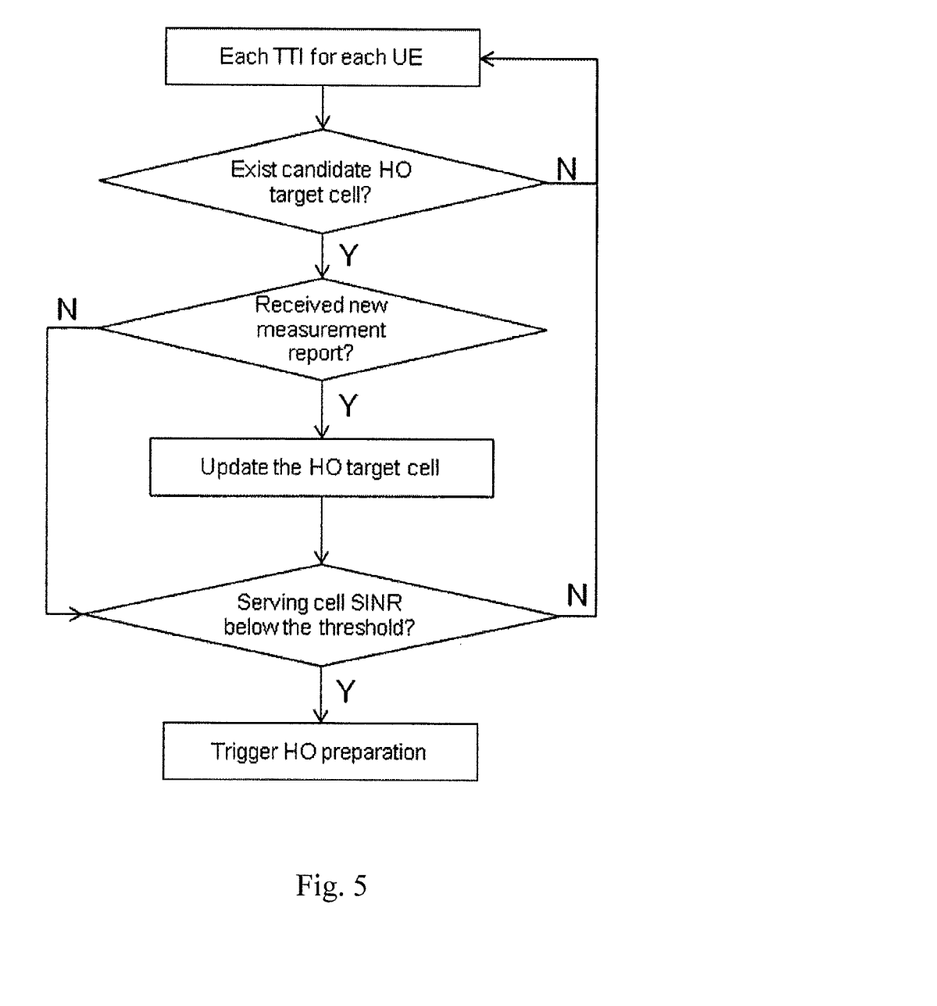
FIG. 5 illustrates a handover method.

To provide a deeper understanding of the handover method may work as described in the following and which is also illustrated in FIG. 5:

(1) The source cell configures a "triggered periodic" A3 event with a low offset (e.g. 1 dB) and 0 ms Time to Trigger (TTT),
The UE will generate a measurement report when a target cell RSRP is "offset" dB better than the serving cell RSRP, which is the A3 trigger point in FIG. 3;
The UE will continue to generate measurement reports periodically whilst this condition is true;

(2) Once a report has been received, the source cell monitors downlink SINR in source cell (if it is not already doing so),
The downlink SINR is estimated by using one or more of CQI reports, RSRP reported measurements, and RSRQ reported measurements;

(3) Once the downlink SINR passes below a threshold value, the handover preparation is triggered for the strongest target cell among the candidate cells in the last measurement report.

Moreover, the handover method can also be implemented as a method in a network control node and in a corresponding network control node device. The method comprises the steps of: monitoring a downlink SINR value $SINR_{DL}$ between the network control node and a mobile station; selecting a target cell for the mobile station based on one or more measurement reports from the mobile station, wherein the measurement reports include measurements on reference signals transmitted from one or more candidate target cells; initiating a handover preparation to the selected target cell for the mobile station based on the downlink SINR value $SINR_{DL}$; and transmitting a handover command message to the mobile station. The handover command instructs the UE to undertake the handover and connect to the specified target cell. The network control node can be any suitably arranged control node such as a base station, an eNode B, a Base Station Controller (BSC) or a Radio Network Controller (RNC).

What is claimed is:

1. A method for improving handover performance in a cellular wireless communication system, said cellular wireless communication system employing a handover procedure in which a handover preparation for a mobile station using a processor is initiated if a channel quality value between a source cell for said mobile station and said mobile station is less than a channel quality threshold value; said method comprising:

tuning said channel quality threshold value based on a handover failure rate $HO_{Error}$ of said cellular wireless communication system,
wherein said channel quality threshold value is increased if the handover failure rate $HO_{Error}$ is higher than a handover failure rate target $HO_{Error\_Target}$ times a first constant $k_1$, and/or
said channel quality threshold value is decreased if the handover failure rate $HO_{Error}$ is less than a handover failure rate target $HO_{Error\_Target}$ times a second constant $k_2$.

2. The method according to claim 1, wherein said first constant $k_1$ is equal to or larger than 1.

3. The method according to claim 1, wherein said second constant $k_2$ is less than or equal to 1.

4. The method according to claim 1, wherein said second constant $k_2$ is less than or equal to said first constant $k_1$.

5. The method according to claim 1, wherein said channel quality threshold value is decreased if the condition in claim 1 is fulfilled and if a handover ping pong rate $HO_{pp}$ is higher than a handover ping pong rate target $HO_{pp\_Target}$.

6. The method according to claim 1, wherein said channel quality value is a downlink signal to interference plus noise ratio (SINR) value $SINR_{DL}$ between said source cell and said mobile station, and said channel quality threshold value is a downlink SINR threshold value $SINR_T$, between said source cell and said mobile station.

7. The method according to claim 6, wherein said downlink SINR value $SINR_{DL}$ is estimated by using at least one of channel quality indication (CQI) reports, reference signal strength (RSRP) reported measurements and reference signal quality (RSRQ) reported measurements.

8. The method according to claim 1, wherein said channel quality value is an uplink SINR value $SINR_{UL}$ between said source cell and said mobile station.

9. The method according to claim 1, wherein said mobile station periodically transmits measurement reports including measurements on reference signals transmitted from one or more candidate target cells, said measurement reports being used for selecting a target cell; said method further comprising:

tuning a periodicity for said periodically transmit measurement reports based on said handover failure rate $HO_{Error}$.

10. The method according to claim 9, wherein said periodically transmitted measurement reports are triggered if a reference signal measurement of a candidate target cell is greater than a reference signal measurement of said source cell by at least a threshold handover offset value; and said method further comprises:

tuning said threshold handover offset value based on said handover failure rate $HO_{Error}$.

11. The method according to claim 9, wherein said tuning further involves considering a signaling load generated by said mobile station when tuning said periodicity and/or said threshold handover offset value.

12. The method according to claim 1, wherein the handover failure rate $HO_{Error}$ is based on a handover history of a target cell.

13. A non-transitory computer-readable medium, for improving handover performance in a cellular wireless communication system, said cellular wireless communication system employing a handover procedure in which a handover preparation for a mobile station is initiated if a channel quality value between a source cell for said mobile station and said mobile station is less than a channel quality threshold value, comprising computer program code, which, when executed by a processor, will cause the processor to tune said channel quality threshold value based on a handover failure rate of said cellular wireless communication system, wherein said channel quality threshold value is increased if the handover failure rate $HO_{Error}$ is higher than a handover failure rate target $HO_{Error\_Target}$ times a first constant k1, and/or said channel quality threshold value is decreased if the handover failure rate $HO_{Error}$ is less than a handover failure rate target $HO_{Error\_Target}$ times a second constant k2.

14. A device for improving handover performance in a cellular wireless communication system, said cellular wireless communication system employing a handover procedure in which a handover preparation for a mobile station is initiated if a channel quality value between a source cell for said mobile station and said mobile station is less than a channel quality threshold value; wherein said device being arranged to tune said channel quality threshold value based on a handover failure rate $HO_{Error}$ of said cellular wireless communication system, wherein said device is configured to increase said channel quality threshold value if the handover failure rate $HO_{Error}$ is higher than a handover failure rate target $HO_{Error\_Target}$ times a first constant $k_1$, and/or said device is configured to decrease said channel quality threshold value if the handover failure rate $HO_{Error}$ is less than a handover failure rate target $HO_{Error\_Target}$ times a second constant $k_2$.

15. The device according to claim 14, wherein said channel quality value is a downlink signal to interference plus noise ratio (SINR) value $SINR_{DL}$ between said source cell and said mobile station, and said channel quality threshold value is a downlink SINR threshold value $SINR_{Tr}$ between said source cell and said mobile station.

16. The device according to claim 14, wherein said channel quality value is an uplink SINR value $SINR_{UL}$ between said source cell and said mobile station.

* * * * *